United States Patent [19]

Bacon

[11] Patent Number: 5,418,450
[45] Date of Patent: May 23, 1995

[54] COUPLING CIRCUIT FOR A MEASURING INSTRUMENT

[75] Inventor: Glade B. Bacon, Everett, Wash.

[73] Assignee: John Fluke Mfg. Co., Inc., Everett, Wash.

[21] Appl. No.: 57,521

[22] Filed: May 3, 1993

[51] Int. Cl.⁶ ............................................. G01R 1/36
[52] U.S. Cl. ..................... 324/110; 324/126
[58] Field of Search ................... 324/110, 128, 126

[56] References Cited

U.S. PATENT DOCUMENTS

| | | | |
|---|---|---|---|
| 3,611,242 | 10/1971 | Obenhaus | 338/23 |
| 3,976,854 | 8/1976 | Ishikawa et al. | 219/505 |
| 4,467,310 | 8/1984 | Jakab | 338/22 R |
| 4,990,987 | 2/1991 | Boucher et al. | 257/467 |
| 5,146,150 | 9/1992 | Gyenes et al. | 320/17 |

OTHER PUBLICATIONS

Supertex Inc., Application Note AN-D11, Sep. 11, 1991.

*Primary Examiner*—Ernest F. Karlsen
*Attorney, Agent, or Firm*—John P. Dellett

[57] ABSTRACT

A coupling circuit for a multimeter adapted to perform multiple measurements includes a thermistor and constant current sources in series between an instrument input terminal and an instrument circuit adapted to source current for ohms measurements. Varistors shunt the constant current sources and are thermally coupled to the thermistor. An initial inrush of current is controlled by the constant current sources and when the voltage across a constant current source reaches the knee voltage of the paralleled varistor, the varistor shunts the constant current source and provides heat to the thermistor for insuring the latter will transition to its high resistance state. The thermistor then drops a substantial part of the input voltage, effectively disconnecting the low impedance ohms circuit from the input terminals and protecting the constant current source circuitry and varistors from extended application of high voltage.

12 Claims, 1 Drawing Sheet

COUPLING CIRCUIT FOR A MEASURING INSTRUMENT

BACKGROUND OF THE INVENTION

The present invention relates to an input coupling circuit for a measuring instrument such as a multimeter, and particularly to such a circuit adapted to decouple an input terminal or terminals from a low impedance path when a voltage is to be measured.

Measuring instruments are available which are multipurpose, e.g. that can provide voltage or resistance measurements at the same set of input terminals or probes without requiring manual switching from one mode of operation to another. Such an instrument typically includes a comparison circuit that will automatically change measurement functions from ohms to AC or DC volts if a voltage signal larger than a predetermined value is detected. This feature is intended to render the meter quicker and easier to use.

For ohms measurements, the multimeter needs to source about 0.5 to 1 milliamperes of DC current from a 1 to 3 volt source. In order to accomplish this result, the resistance in the meter circuit has to be less than approximately 10,000 ohms. However, the same circuit must withstand the maximum rated input voltage of the multimeter, typically in the range of 600 to 1000 volts. A 10,000 ohm resistor in series with the circuit would drop this voltage, but the power rating required would result in a physical resistor size prohibitively large for a hand-held instrument. Furthermore, voltage measuring instruments are conventionally high impedance devices in order to maintain measuring accuracy and avoid loading the circuit under test. A much higher impedance than a few thousand ohms is required to prevent excessive current from being drawn.

The problem can be solved in part by inserting a positive temperature coefficient (PTC) thermistor in series between the ohms measurement current sourcing circuit and the instrument input terminals. Then, when a voltage higher than a predetermined value is presented, sufficient current will flow through the thermistor body as will cause its resistance to change from a relatively low value to a value of several hundred thousand ohms whereby excessive current flow is inhibited. However, thermistors are not instantaneous in their operation and an initial surge or influx of current can result before the Curie temperature is reached, i.e., before the thermistor transitions to a high resistance state. This initial influx current can be objectionable from the standpoint of the circuit across which the voltage is being measured. It would be desirable, then, to be able to measure voltages in a multipurpose instrument without large currents being drawn.

SUMMARY OF THE INVENTION

In accordance with the present invention, input coupling means interposed between input terminals or probes of an instrument and a current sourcing circuit includes a thermistor, and a current limiting means in series, wherein the current limiting means is able to detect increased current and immediately increase its impedance. The current limiting means preferably comprises a constant current source circuit having a feedback connection and operating to inhibit the current from exceeding a given value. In a specific embodiment the constant current source circuit comprises series MOSFET transistors connected back-to-back and including a bias resistor therebetween for current detection.

According to another feature of the present invention, a metal oxide varistor (MOV) is disposed in shunt relation with the above-mentioned constant current source circuit for protecting the latter when voltage drop across the constant current source circuit increases above a given value. Furthermore, heat coupling means are provided between the varistor and the aforementioned thermistor such that as the varistor reaches its knee voltage and its temperature increases, heat is rapidly transferred to the thermistor causing the latter to transition to its high resistance state and protect both the current source circuit and the varistor. Additional current source circuits, each shunted by a varistor, can be inserted in series between the input terminals and the instrument circuit.

It is accordingly an object of the present invention to provide an improved coupling circuit for a multimeter instrument, which circuit is adapted to change measuring functions without producing undesirable effects.

It is another object of the present invention to provide an improved coupling circuit for a multimeter instrument, said coupling circuit normally providing a low impedance path, with change to a high impedance state in order to avoid an undesirable initial rush of current from a source of voltage being measured.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DRAWINGS

DETAILED DESCRIPTION

Figure 1:
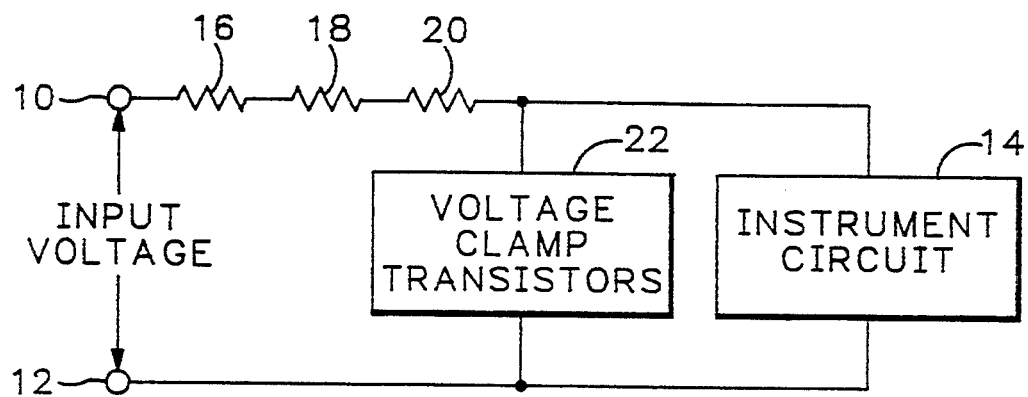
FIG. 1 is a schematic diagram of a prior art coupling circuit for a multipurpose measuring instrument.

Referring to FIG. 1, illustrating a prior art coupling circuit for a portion of a multimeter instrument, input terminals or probes 10 and 12 are coupled to instrument circuit 14 which in this instance sources current for resistance (ohms) measurements. Fusible resistor 16, standard resistor 18 and positive temperature coefficient (PTC) thermistor 20 are serially connected between terminal 10 and circuit 14. A known shunt protection circuit 22 is coupled across circuit 14 and suitably comprises a pair of voltage clamp transistors connected back-to-back and designed to operate in the manner of a zener diode. Thus, should the voltage across circuit 14 rise above a predetermined value, e.g. ten volts, circuit 22 will conduct.

Assuming the absence of substantial voltage applied between terminals 10 and 12, the instrument is designed to operate in the "ohms" mode whereby circuit 14 sources current through elements 16, 18 and 20, all of which exhibit a low resistance under these conditions. However, should a voltage greater than a few volts be applied to terminals 10 and 12 pursuant to taking a voltage measurement, it is intended the circuit of FIG. 1 will be substantially disconnected inasmuch as a low impedance across the input terminals is undesirable from the standpoint of accuracy of the measurement, and also because damage or misadjustment may result in regard to the measured circuit. The voltage between terminals 10 and 12 is measured in cooperation with other means via a high input impedance, not shown in FIG. 1.

When a voltage equal to or higher than a predetermined voltage value appears between terminals 10 and 12, the body of thermistor 20 heats above the Curie temperature and its resistance changes from a few ohms to several hundred thousand ohms, limiting power dissipation to approximately one watt. Fusible resistor 16 may open if a large enough voltage is applied, but normally when the voltage is removed the thermistor cools and returns to its normal state so that ohms measurements can once more take place.

The circuit of FIG. 1, although very useful, exhibits some shortcomings. With the application of input voltages near the maximum rating of the multimeter, a large (hundreds of milliamperes) initial input current can pass through thermistor 20 before it changes to its high resistance state. In many instances, this will cause a problem for the instrument user, i.e. it can be undesirable to draw a surge of current from the measured circuit. Moreover, with large input voltages the thermistor exhibits a dielectric absorption effect such that after a large input voltage is removed, the thermistor generates its own voltage and reduces the instrument's response time. Thermal cycling of the thermistor from repeated measurements can also cause reliability problems and the high temperature of the thermistor can limit the upper operating temperature of the instrument.

Figure 2:
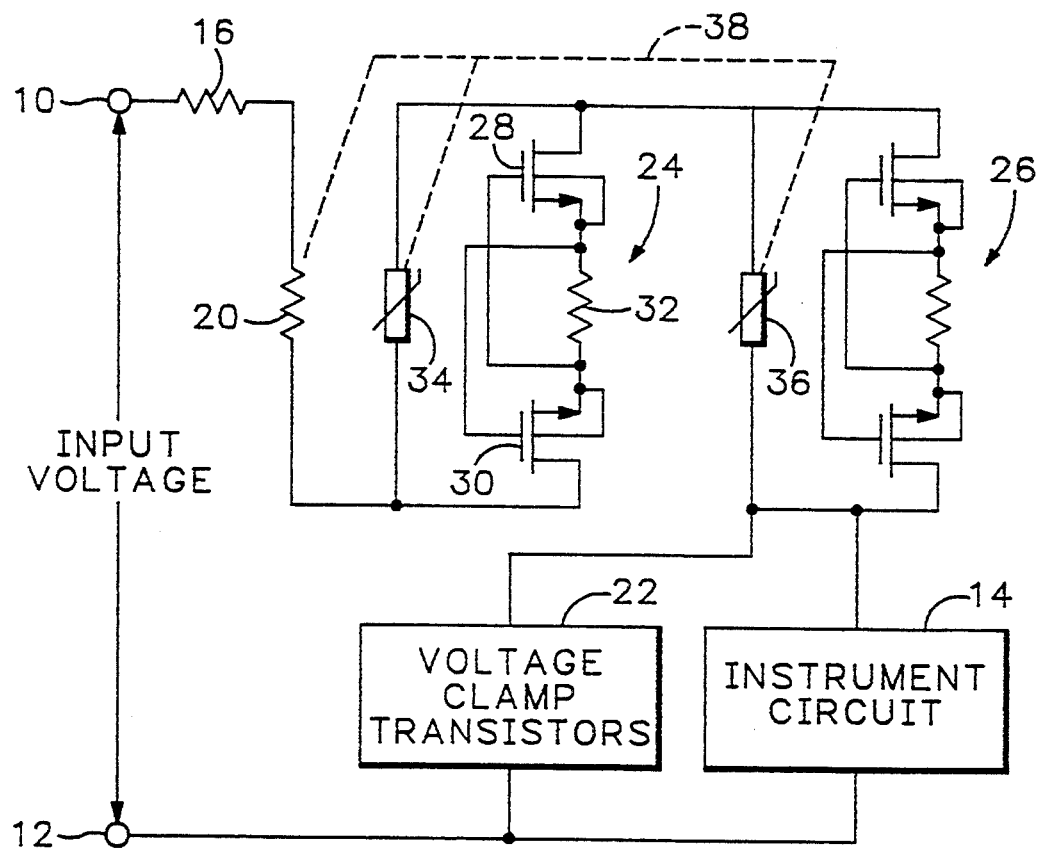
FIG. 2 is a schematic diagram of an instrument coupling circuit in accordance with the present invention.

Referring now to FIG. 2, a coupling circuit according to the present invention is illustrated wherein corresponding elements are indicated by like reference numerals. The circuit of FIG. 2 is provided with current limiting means comprising a first constant current circuit 24 and a second constant current circuit 26 in series relation together with fusible resistor 16 and thermistor 20. The pair of constant current circuits are chosen to accommodate a particular instrument voltage rating, it being understood that one such circuit, or more than two circuits in series can be substituted as desired.

Each circuit, for example circuit 24, comprises a pair of constant current sources here including N-channel depletion mode MOSFETs configured back-to-back with their sources joined via bias resistor 32 for completing a series circuit. The value of resistor 32 is chosen to set the current limiting value. The drain of transistor 30 is connected to thermistor 20 and the drain of transistor 28 is connected to the drain of the first transistor in the next current source circuit 26.

The gate of transistor 28 is coupled to the opposite end of resistor 32, i.e. at the source of transistor 30, while the gate of transistor 30 is similarly coupled in feedback fashion to the terminal of resistor 32 connected to the source of transistor 28 for the purpose of detecting increased current. Under ordinary circumstances during "ohms" measurements transistors 28 and 30 are fully on and provide a fairly low resistance current carrying path compatible with the ohms measurement. However, when the current through resistor 32 reaches a predetermined threshold, the respective gates of transistors 28 and 30 each receive a feedback voltage preventing the current through the transistors from rising above a predetermined value. Therefore an initial inrush of current into the circuit is avoided when a voltage of predetermined value or above is presented between terminals 10 and 12. The impedance of the current source means is in effect increased and the maximum initial input current is typically reduced by a factor of one hundred or more.

The circuit is also provided with metal oxide varistors (MOVs) 34 and 36 respectively disposed in shunt relation across current source circuit 24 and current circuit 26. The varistors 34 and 36 protect the transistors of the current source circuits 24 and 26 from excessive drain-to-source voltage. Thus, as the current through and consequently the voltage across the current source circuits reach predetermined values, the varistor knee voltages are reached and the varistors shunt the constant current circuits 24 and 26 for protecting the same. Moreover, heat coupling means, indicated by dashed lines 38 in FIG. 2, are provided between the varistors and thermistor 20. When a varistor starts to conduct, heat is immediately supplied from the varistor to thermistor 20 causing or expediting its transition to a high resistance condition. The thermistor 20 will now drop a high proportion of the input voltage between terminals 10 and 12, effectively isolating the circuit of FIG. 2 during voltage measurements while also protecting varistors 34, 36 and current source circuits 24, 26 from continued high voltage conditions as might otherwise result in their failure.

Figure 3:
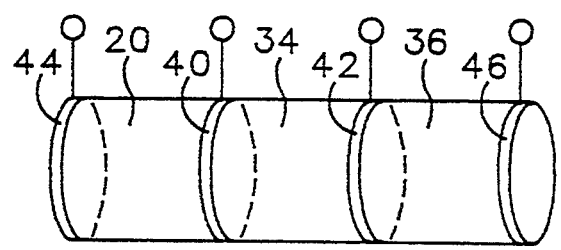
FIG. 3 is a perspective view of components of the FIG. 2 circuit as joined in heat conducting relation.

The heat coupling means indicated by dashed lines 38 in FIG. 2 can be implemented by joining the thermistor 20 and varistors 34, 36 together in end-to-end relation as illustrated in FIG. 3. The thermistor and varistors suitably comprise bulk devices or slugs of cylindrical configuration disposed in a column having a metal spacer 40 separating elements 20, 34, and a metal spacer 42 separating elements 34, 36. The spacers 40 and 41 are soldered between the metalized ends of the individual thermistor and varistor slugs wherein the solder may comprise a heat setting, metal filled epoxy resin. The metal ends at the left hand and right hand ends of the column as viewed in FIG. 3 may be provided with electrically conductive disks 44 and 46. The FIG. 3 embodiment provides the desired electrical connection and heat conducting relation of elements 20, 34 and 36; however, other physical embodiments for supplying desired heat conduction can be substituted.

Thus, in accordance with the present invention, a low impedance instrument circuit utilized for current sourcing is in effect removed from a testing circuit when a voltage above a predetermined value appears across instrument input terminals. A current reducing series thermistor, capable of passing an undesired initial inrush current, is aided in current reduction by employing current limiting means for detecting such current before the thermistor may switch or transition to its high resistance state. The current limiting means suitably comprise constant current source circuits shunted by varistors thermally coupled to the thermistor whereby to protect the current source circuits and provide heat to insure transition of the thermistor to its high resistance state.

While preferred embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A coupling circuit for an instrument comprising:
   input terminal means,
   input coupling means interposed between said input terminal means and a circuit of said instrument to couple said input terminal means to said circuit of said instrument,
   thermistor means in series relation with said input coupling means, and
   current limiting means in series relation with said input coupling means,
   said current limiting means including active circuit means for detecting an increased current level in said current limiting means and in response thereto increasing the series impedance.

2. The circuit according to claim 1 wherein said current limiting means comprises a constant current source circuit.

3. The circuit according to claim 2 wherein said constant current source circuit comprises a series pair of MOSFET transistors, and a bias resistor connected in series intermediate the principal current carrying paths of said transistors, the gate of each said transistor being coupled to the terminal of the bias resistor connected to the remaining transistor.

4. The circuit according to claim 2 further including a varistor in shunt relation with said constant current source circuit.

5. The circuit according to claim 4 including heat coupling means between said varistor and said thermistor means.

6. The circuit according to claim 5 wherein said heat coupling means comprises means joining said varistor with said thermistor means in end-to-end relation.

7. A coupling circuit for an instrument wherein said instrument is adapted to perform multiple measurement functions, said coupling circuit comprising:
   input terminal means,
   input coupling means between said input terminal means and a circuit of said instrument,
   thermistor means, and current limiting means, both in series relation with said input coupling means, said current limiting means comprising at least one current source circuit, and
   a varistor in shunt relation with said current source circuit,
   wherein said thermistor means is disposed in heat conducting relation with said varistor so that when a predetermined voltage drop occurs across said current source circuit causing said varistor to conduct, the heat generated in said varistor is coupled to said thermistor means whereby the resistance of said thermistor means increases and the voltage drop across said current source circuit and varistor is decreased.

8. The circuit according to claim 7 wherein said thermistor means comprises a positive temperature coefficient thermistor.

9. The circuit according to claim 7 wherein said varistor comprises a metal oxide varistor.

10. The circuit according to claim 7 wherein said thermistor means and said varistor are joined end-to-end to provide said heat conducting relation.

11. The circuit according to claim 7 including an additional current source circuit shunted by an additional varistor, wherein the parallel combination of the additional current source circuit and the additional varistor is coupled in series with the parallel combination of the first mentioned varistor and said at least one current source circuit.

12. The circuit according to claim 11 wherein the first mentioned thermistor means, the first mentioned varistor, and said additional varistor are joined in heat conducting, end-to-end relation.

* * * * *